United States Patent
Jang et al.

(10) Patent No.: US 9,335,584 B2
(45) Date of Patent: May 10, 2016

(54) DISPLAY DEVICE

(71) Applicant: SAMSUNG ELECTRONICS CO., LTD., Suwon-si (KR)

(72) Inventors: Nae Won Jang, Seongnam-si (KR); Young Man Ahn, Suwon-si (KR); Dae Hee Lee, Hwaseong-si (KR); Byoung Jin Cho, Anyang-si (KR); Hyeong Sik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 14/300,636

(22) Filed: Jun. 10, 2014

(65) Prior Publication Data

US 2015/0002778 A1    Jan. 1, 2015

(30) Foreign Application Priority Data

Jul. 1, 2013    (KR) .................. 10-2013-0076470

(51) Int. Cl.
*G02F 1/1335*    (2006.01)
*G02B 5/136*    (2006.01)
*F16B 5/06*    (2006.01)

(52) U.S. Cl.
CPC .... *G02F 1/133605* (2013.01); *G02F 1/133603* (2013.01); *F16B 5/0635* (2013.01); *G02B 5/136* (2013.01); *G02F 1/133611* (2013.01); *G02F 2201/46* (2013.01)

(58) Field of Classification Search
CPC ............................................... G02F 1/133603
See application file for complete search history.

(56) References Cited

U.S. PATENT DOCUMENTS 9,097,849 B2 * 8/2015 Yoneno .................. G03B 21/28
9,182,525 B2 * 11/2015 Kim ..................... G02B 5/124

2009/0296202 A1 * 12/2009 Wei ........................ G02B 5/124
                                                            359/359
2012/0081788 A1 * 4/2012 Maekawa ............... G02B 5/124
                                                            359/546
2012/0092766 A1 * 4/2012 Maekawa ............... G02B 5/136
                                                            359/546
2013/0070165 A1    3/2013 Shimizu
2013/0222705 A1    8/2013 Shimizu
2015/0055059 A1 * 2/2015 Suzuki ............. G02F 1/133605
                                                            349/67
2015/0160513 A1 * 6/2015 Lee .................. G02F 1/133609
                                                            349/69
2015/0309366 A1 * 10/2015 Park ................ G02F 1/133605
                                                            349/58

FOREIGN PATENT DOCUMENTS

WO    2012032978 A1    3/2012
WO    2012073778 A1    6/2012

OTHER PUBLICATIONS

Communication dated Aug. 6, 2014 issued by the European Patent Office in counterpart European Patent Application No. 14169959.5.
Communication issued on Oct. 21, 2015 by the European Patent Office in related Application No. 14169959.5.

* cited by examiner

*Primary Examiner* — Timothy L Rude
(74) *Attorney, Agent, or Firm* — Sughrue Mion, PLLC

(57) ABSTRACT

Disclosed is a display device which includes a liquid crystal display configured to display an image, a plurality of backlights which are disposed in a rear area of the liquid crystal display and comprise a plurality of point light sources, a bottom chassis on which the backlights are disposed, and a plurality of reflective devices which are mounted on the bottom chassis and reflect light, which is emitted from a plurality of light sources disposed at corners of the bottom chassis and diffused in a sideward direction, toward the corners of the bottom chassis so as to secure a sufficient amount of light at the corners of the bottom chassis.

20 Claims, 7 Drawing Sheets

DISPLAY DEVICE

CROSS-REFERENCE TO RELATED APPLICATION

This application claims the benefit of Korean Patent Application No. 10-2013-0076470, filed on Jul. 1, 2013 in the Korean Intellectual Property Office, the entire disclosure of which is incorporated herein by reference.

BACKGROUND

1. Field

Exemplary embodiments relate to a display device which may achieve uniform picture quality.

2. Description of the Related Art

In general, a display device is a device which visually displays data information, such as characters and figures, and images.

Display devices of the related art may be classified into emissive display devices and non-emissive display devices. The emissive display devices are display devices which may emit light by itself. Emissive display devices include a plasma display panel (PDP). Non-emissive display devices are display devices which may not emit light by themselves. Non-emissive displays include a liquid crystal display (LCD). Recently, in the related art, a liquid crystal display having excellent performance has been widely used.

In a liquid crystal display of the related art, a liquid crystal display panel displays data information or a picture, such as an image, receives light from a backlight unit, and displays a picture. Backlight units are classified into a direct type and an edge type according to positions of light sources.

An edge type backlight unit has a structure in which a lamp unit is disposed on the side surface of a light guide panel. The edge type backlight unit may be applied to liquid crystal displays having a relatively small size, such as a laptop computer and a desktop computer.

A direct type backlight unit has a structure in which a plurality of lamps are disposed in parallel under a liquid crystal display panel. Since light emitted from the plurality of lamps is directly supplied to the liquid crystal display panel, the direct type backlight unit may be mainly used as large-screen liquid crystal displays which require high luminance.

In case of the direct type backlight unit (hereinafter, the backlight unit), a lens scattering light emitted from a light source may be provided above the light source. As seen from above, the lens may scatter light emitted from the light source in a circular shape.

A liquid crystal display of the related art is mainly formed in a rectangular shape. Further, since a distance from a light source of a backlight unit to a corner is long, the amount of light incident upon the corner of the liquid crystal display is smaller than the amount of light incident upon other regions. The corner of the liquid crystal display, upon which a small amount of light is incident as compared to other regions, may be recognized as dark regions. Thus, the display device may have non-uniform luminance and low picture quality.

SUMMARY

Therefore, it is an aspect of the exemplary embodiments to provide a display device in which reflective units are provided at the corners of a bottom chassis. Therefore, a sufficient amount of light at the corners of the display device is secured by reflecting light, emitted from light sources located at the corners of the display device and diffused in the sideward direction, toward the corners. Thus, generation of dark regions is prevented.

Additional aspects of the exemplary embodiments will be set forth in part in the description which follows and, in part, will be obvious from the description, or may be learned by practice of the exemplary embodiments.

An aspect of the exemplary embodiments may include a display device which includes a liquid crystal display configured to display an image, a plurality of backlight devices which are disposed in a rear area of the liquid crystal display and comprise a plurality of point light sources, a bottom chassis on which the backlight devices are disposed, and a plurality of reflective devices which are mounted on the bottom chassis and reflect light, which is emitted from a plurality of light sources disposed at the corners of the bottom chassis and diffused in the sideward direction, toward the corners of the bottom chassis so as to secure a sufficient amount of light at the corners of the bottom chassis.

A reflective sheet may be disposed on an inner surface of the bottom chassis.

The bottom chassis may include a lower surface part and a side surface part, and the reflective sheet may be disposed on the lower surface part and the side surface part.

The reflective devices may be disposed on the reflective sheet.

The reflective devices may be mounted on the bottom chassis via the reflective sheet to fix the reflective sheet to the bottom chassis.

Each of the reflective devices may include a body, a plurality of arms which extend from one end of the body, and a plurality of reflective ribs which protrude from the arms in the forward direction in which the liquid crystal display is located.

The arms may include a first arm which is extended from the one end of the body in a leftward direction and a second arm which is extended from the one end of the body in a rightward direction.

Reflective parts which are formed of metal having high reflectance may be disposed on the reflective ribs.

The reflective parts may be tapes which are formed of silver or panels which are formed of silver.

The reflective parts may be formed of a same material as the reflective sheet.

The reflective parts may be formed of a material having a similar reflectance as the reflective sheet.

A combination part which protrudes in a direction opposite the reflective ribs may be disposed on the body.

Holes may be provided on the bottom chassis, and each of the reflective devices may be mounted on the bottom chassis by inserting the combination part into each of the holes, and then sliding each of the reflective devices.

A projection may be provided on the combination part and pressurize a rear surface of the bottom chassis to fix each of the reflective devices to the bottom chassis in response to each of the reflective devices being mounted on the bottom chassis.

A reflective sheet may be disposed on the bottom chassis to be fixed to the bottom chassis by causing the combination part to pass through the reflective sheet and the bottom chassis, and then sliding each of the reflective devices.

An aspect of an exemplary embodiment may include a reflective device which includes a body; a plurality of arms which extend away from one side of the body in a diagonal direction; and a plurality of reflective ribs which extend away from the arms in a first perpendicular direction from a surface of the arms.

BRIEF DESCRIPTION OF THE DRAWINGS

These and/or other aspects of the exemplary embodiments will become apparent and more readily appreciated from the following description of the embodiments, taken in conjunction with the accompanying drawings of which.

DETAILED DESCRIPTION OF THE EXEMPLARY EMBODIMENTS

Figure 1:
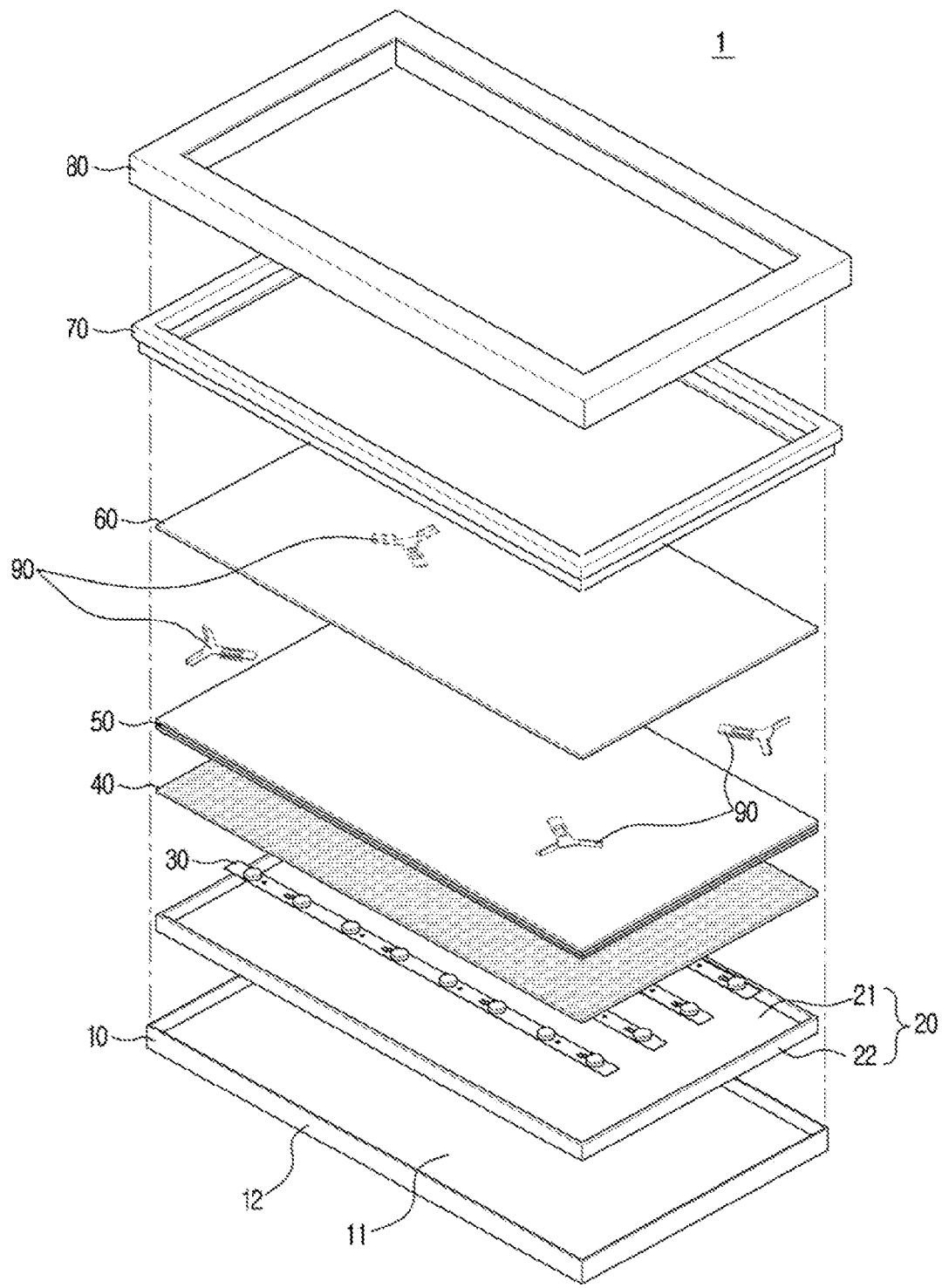
FIG. 1 is an exploded perspective view of a display device in accordance with one embodiment.

Reference will now be made in detail to the embodiments, examples of which are illustrated in the accompanying drawings, wherein like reference numerals refer to like elements throughout.

Figure 2:
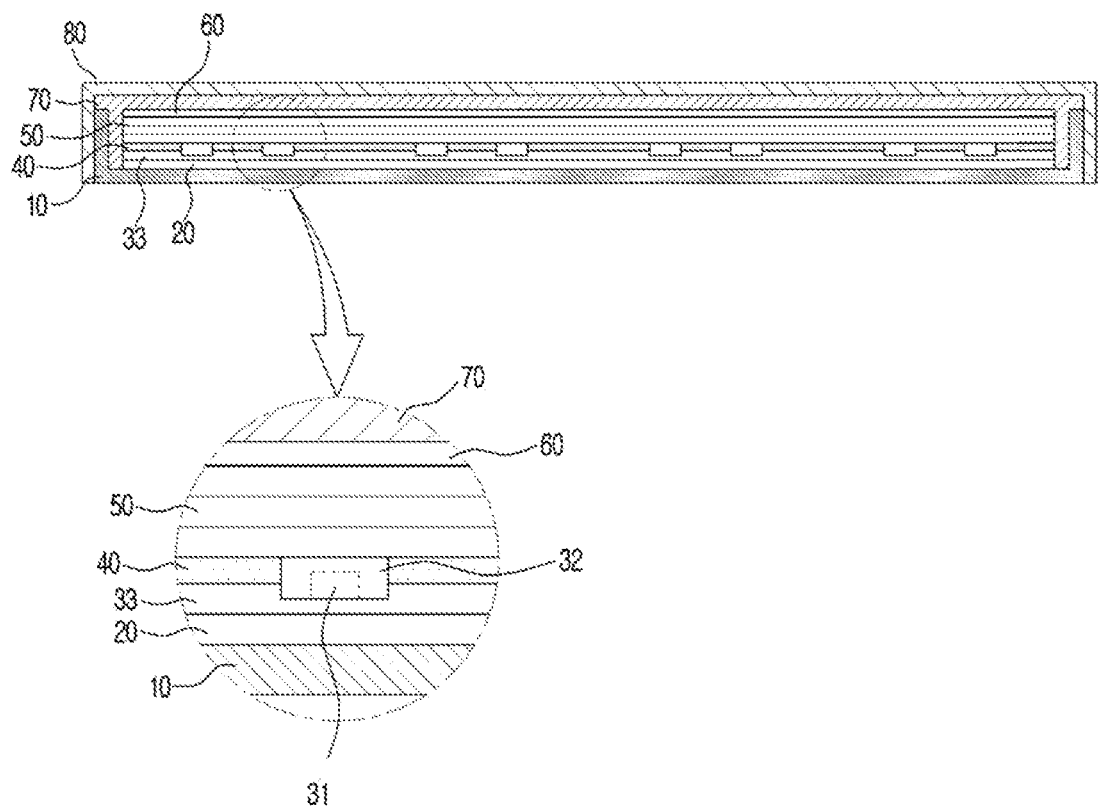
FIG. 2 is a cross-sectional view of the display device in accordance with the embodiment.

FIG. 1 is an exploded perspective view of a display device in accordance with one embodiment, and FIG. 2 is a cross-sectional view of the display device in accordance with the one embodiment.

With reference to FIGS. 1 and 2, a display device 1 in accordance with one embodiment includes a rear cover 10, a bottom chassis 20, backlight units 30, a reflective sheet 40, a plurality of optical sheets 50, a liquid crystal display panel 60, a top chassis 70, and a front cover 80. The backlight units 30, the reflective sheet 40, and the plurality of optical sheets 50 may be placed on the bottom chassis 20 and provided within a space between the rear cover 10 and the front cover 80.

The rear cover 10 and the front cover 80 may form the external appearance of the display device 1. The rear cover 10 and the front cover 80 may be formed of plastic resin. Various ornaments (not shown) may be attached to the front cover 80 for aesthetic purposes. A heat sink (not shown) to discharge heat generated from the display device 1 may be provided on the rear cover 10.

The bottom chassis 20, the backlight units 30, the reflective sheet 40, the plurality of optical sheets 50, and the liquid crystal panel 60 may be received within the space formed by the rear cover 10 and the front cover 80. The rear cover 10 includes a lower surface part 11 on which the backlight units 30 are placed and a side surface part 12 extended upward from the circumference of the lower surface 11.

The bottom chassis 20 may be placed on the rear cover 10. The backlight units 30 may be placed on the bottom chassis 20. The bottom chassis 20 includes a lower surface part 21 and a side surface part 22. The reflective sheet 40 may be provided within the lower surface part 21 and the side surface part 22 of the bottom chassis 20. The backlight units 30 and the plurality of optical sheets 50 may be placed on the bottom chassis 20.

The backlight units 30 may be located in the rear of the liquid crystal display panel 60. The backlight unit 30 includes light sources 31, lenses 32, and a printed circuit board 33. The light sources 31 may be mounted on the front surface of the printed circuit board 33. The light sources 31 may be a plurality of light emitting diodes provided as point light sources. The plural light sources 31 may be separated from each other by a designated interval.

The lens 32 may be installed on the light source 31 for diffusing light emitted from the light source 31. The lens 32 is provided in various shapes. The lens 32 may diffuse light, which is emitted upward from the light source 31, in the sideward direction within the range of a viewing angle according to the shape of the lens 32. Thus, light is allowed to be uniformly incident upon the entirety of the liquid crystal display panel 60.

The reflective sheet 40 may be formed of a highly reflective material. The reflective sheet 40 may be provided on the inner surface of the bottom chassis 20. The reflective sheet 40 may cover the lower surface part 21 and the side surface part 22 of the bottom chassis 20. The reflective sheet 40 covers the side surface part 22. Thus, the reflective sheet 40 may reflect light, which is incident upon the side surface part 22, toward the liquid crystal display panel 60.

The light sources 31 or the lenses 32 may be provided so as to be exposed from the upper surface of the reflective sheet 40 through holes (not shown) formed on the reflective sheet 40. Light emitted from the light sources 31 may travel straight and be incident upon the liquid crystal display panel 60. Alternatively, light emitted from the light sources may be reflected by the reflective sheet 40 and be thus incident upon the liquid crystal display panel 60.

The plurality of optical sheets 50 may be provided on the reflective sheet 40. The plurality of optical sheets 50 may include a diffusion sheet, a prism sheet, a protective sheet, and a reflective polarizing sheet.

The diffusion sheet may diffuse light emitted from the light sources 31. The prism sheet may be disposed on the diffusion sheet and condense light, which is diffused by the diffusion sheet, to improve front luminance. The reflective polarizing sheet may be disposed on the protective sheet. The reflective polarizing sheet may reflect and polarize light, which is condensed by the prism sheet, to convert the light into light having a polarizing axis transmitted by the liquid crystal display panel 60. The protective sheet may be disposed between the prism sheet and the reflective polarizing sheet to prevent generation of blurring on a picture due to the prism sheet.

The above-described plurality of optical sheets 50 may improve optical characteristics of light emitted from the backlight units 30. Thus, luminance of the display device 1 is improved.

The liquid crystal display panel 60 may form a picture by adjusting alignment of a liquid crystal layer. Since the liquid crystal display panel 60 may not emit light by itself, the liquid crystal display panel 60 may display a picture by light supplied from the backlight units 30.

The top chassis 70 may be located on the liquid crystal display panel 60. The top chassis 70 pressurizes the edge of the liquid crystal display panel 60 toward the bottom chassis 20. Thus, the top chassis 70 may fix the position of the liquid crystal display panel 60.

The front cover 80 may be located on the top chassis 70 to form the external appearance of the front portion of the display device 1. Ornaments may be attached to the front cover 80 so as to improve the aesthetic appearance of the display device 1. Further, surface treatment, such as etching, may be performed on the front cover 80 so as to provide a luxurious feel.

Figure 3:
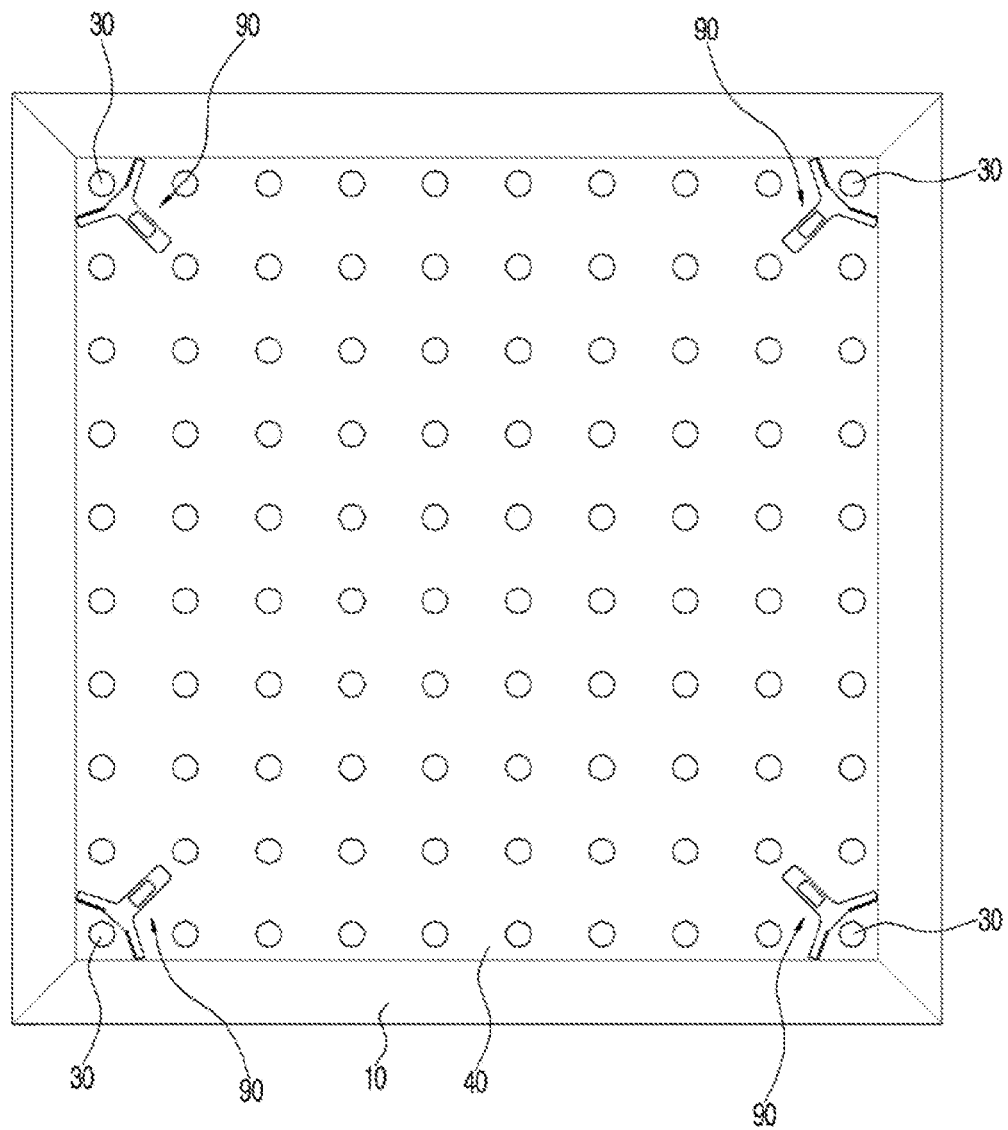
FIG. 3 is a view illustrating a bottom chassis on which backlight units are mounted in accordance with the embodiment.
Figure 4:
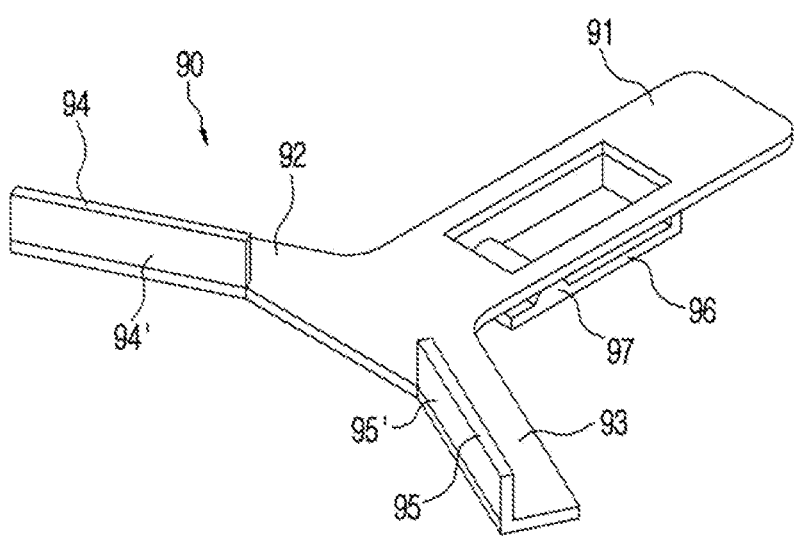
FIG. 4 is a perspective view illustrating the shape of a reflective unit in accordance with the embodiment.
Figure 5:
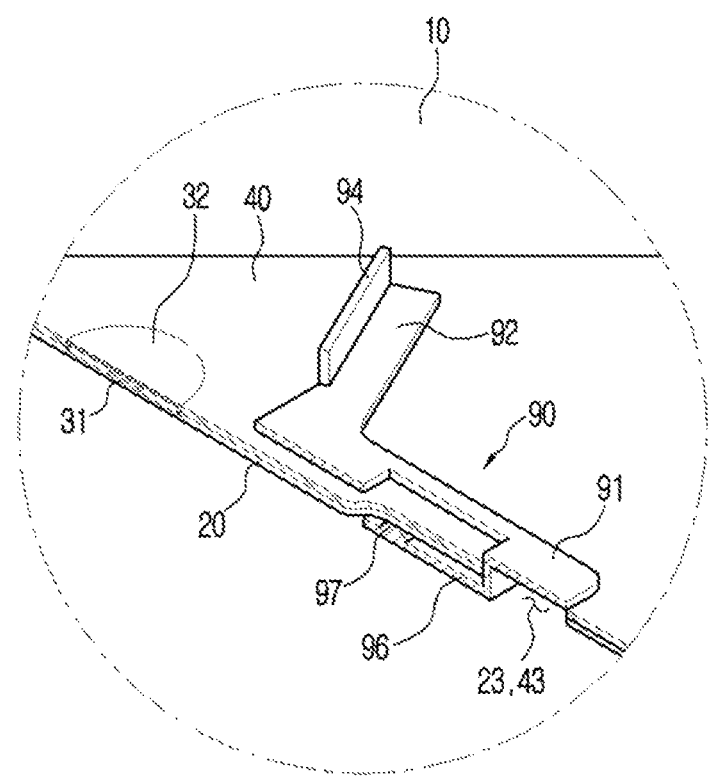
FIGS. 5 and 6 are views illustrating mounting of the reflective unit on the bottom chassis in accordance with the embodiment.
Figure 6:
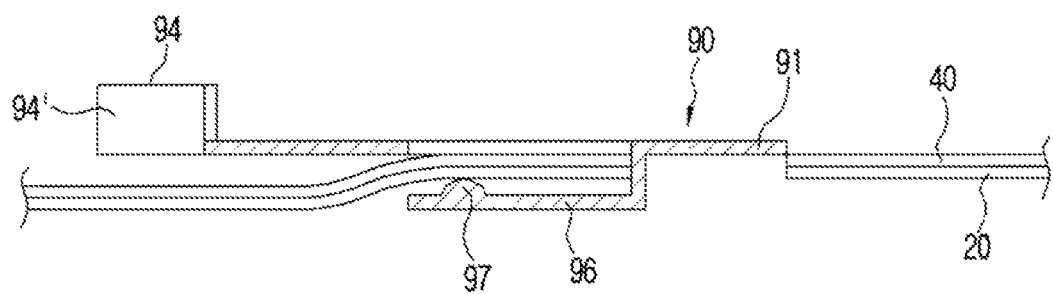
Figure 7:
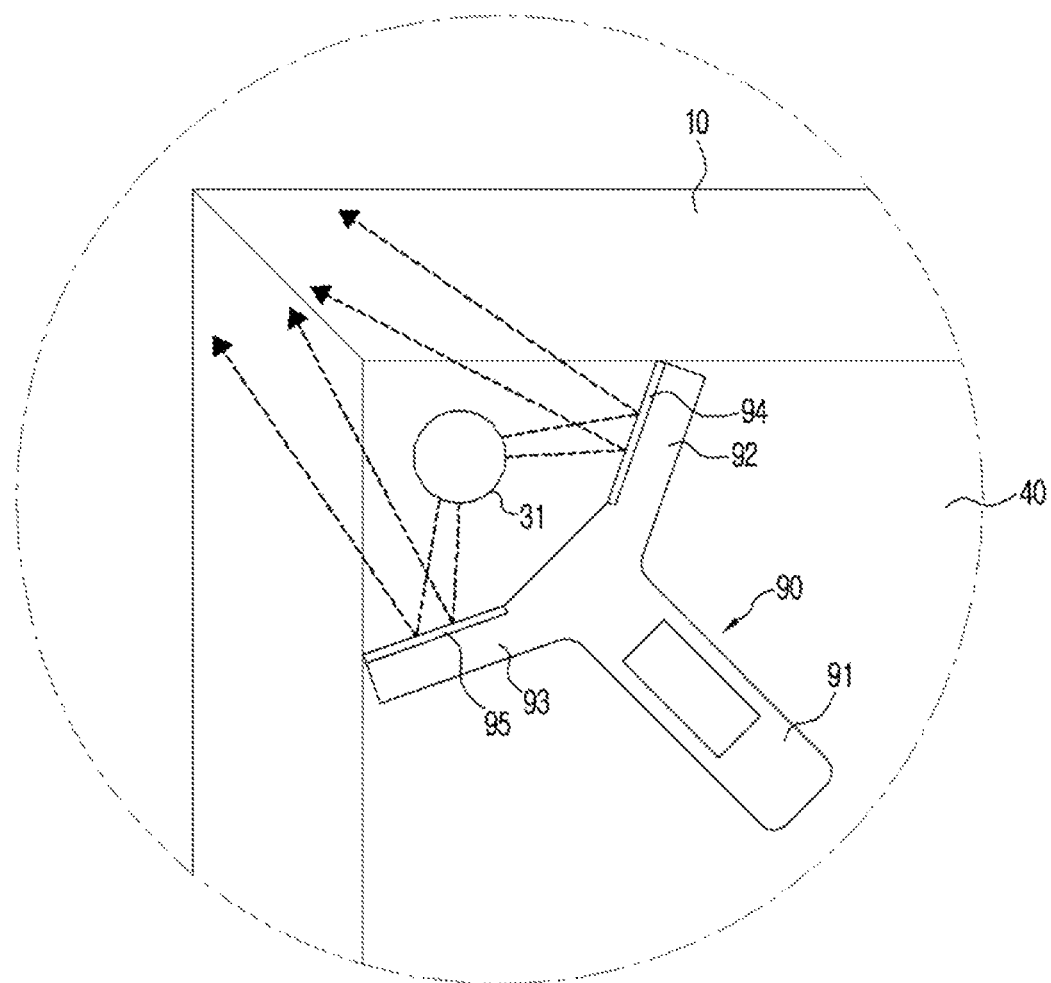
FIG. 7 is a view illustrating a path of light by the reflective unit in accordance with the embodiment.

FIG. 3 is a view illustrating the bottom chassis on which the backlight units are mounted in accordance with the embodiment, FIG. 4 is a perspective view illustrating the shape of a reflective unit in accordance with the embodiment, FIGS. 5 and 6 are views illustrating mounting of the reflective unit on the bottom chassis in accordance with the embodiment, and FIG. 7 is a view illustrating a path of light by the reflective unit in accordance with the embodiment.

With reference to FIGS. 3 to 7, reflective units 90 may be mounted on the bottom chassis 20 in accordance with the embodiment. The reflective units 90 may be provided at the corner regions of the bottom chassis 20. The reflective units 90 provided at the corner regions of the bottom chassis 20 may reflect light, emitted from the backlight units 30, so as to be incident upon the corner regions of the display device 1.

The reflective units 90 may be located on the reflective sheet 40. The reflective units 90 may be mounted on the upper surface of the reflective sheet 40 to fix the reflective sheet 40 to the bottom chassis 20.

Each of the reflective units 90 may include a body 91, arms 92 and 93, and reflective ribs 94 and 95. The arms 92 and 93 may be extended from the body 91. The reflective ribs 94 and 95 may be extended from the arms 92 and 93. If the reflective unit 90 is mounted on the bottom chassis 20, the reflective ribs 94 and 95 may be extended in the forward direction of the display device 1.

The arms 92 and 93 may include a first arm 92 and a second arm 93. The arms 92 and 93 may be extended from the body 91 in the sideward direction. The first arm 92 and the second arm 93 may be extended from one end of the body 91 in opposite directions.

When the reflective unit 90 is mounted on the bottom chassis 20, the light source 31 provided at the corner region of the bottom chassis 20 may be located within a space formed by the corner of the side surface part 22 of the bottom chassis 20, the first arm 92, and the second arm 93.

The reflective ribs 94 and 95 may include a first reflective rib 94 and a second reflective rib 95. The first reflective rib 94 may be extended from the first arm 92, and the second reflective rib 95 may be extended from the second arm 93. When the reflective unit 90 is mounted on the bottom chassis 20, the first reflective rib 94 and the second reflective rib 95 may protrude in the forward direction of the display device 1.

Since the reflective ribs 94 and 95 are not precisely provided in the diagonal direction of the bottom chassis 20 and protrude from the arms 92 and 93 extended from the body 92 in the left and right sides, a part of light emitted form the light source 31 may progress in a direction opposite the corner of the bottom chassis 20. Thus, generation of a dark region is prevented between the light source 31 located at the corner of the bottom chassis 20 and another region 31 located at a position adjacent thereto.

Reflective parts 94' and 95' may be provided on at least one surface of each of the first reflective rib 94 and the second reflective rib 95. The reflective parts 94' and 95' may be reflective tapes or metal panels formed of metal having high reflectance. When the reflective unit 90 is placed on the bottom chassis 20, the reflective parts 94' and 95' may face the light source 31.

For example, the reflective parts 94' and 95' may be tapes or panels formed of silver (Ag). However, the material of the reflective parts 94' and 95' is not limited thereto. The reflective parts 94' and 95' may be formed of the same material as the reflective sheet 40, or have similar reflectance to reflectance of the reflective sheet 40. Therefore, dark regions or hot spots due to the reflective units 90 may be prevented.

Although the above embodiment describes the reflective parts 94' and 95' as being separately provided on the reflective unit 90, the entire surface of the reflective unit 90 may be coated with metal having high reflectance or the reflective unit 90 may be formed of metal having high reflectance.

The reflective parts 94' and 95' include a first reflective part 94' and a second reflective part 95'. The first reflective part 94' may be provided on the first reflective rib 94, and the second reflective part 95' may be provided on the second reflective rib 95. When the reflective unit 90 is mounted at the corner of the bottom chassis 20, the first reflective part 94' and the second reflective part 95' face the light source 31. Thus, the first reflective part 94' and the second reflective part 95' may reflect light, which is emitted from the light source 31 and incident upon the first reflective part 94' and the second reflective part 95', toward the corner of the bottom chassis 20.

A combination part 96 may protrude from one side of the body 91 of the reflective unit 90. A hole 23 may be formed at the corner of the bottom chassis 20, and the combination part 96 may be located on the rear surface of the bottom chassis 20 via the hole 23. In other words, the combination part 96 of the reflective unit 90 is inserted into the hole 23 and then slides. Thus, the reflective unit 90 may be mounted on the bottom chassis 20.

The combination part 96 may protrude in a direction opposite the protruding direction of the first reflective rib 94 and the second reflective rib 95. In other words, when the reflective unit 90 is mounted on the bottom chassis 20, the combination part 96 may be located on the rear surface of the bottom chassis 20 and the first reflective rib 94 and the second reflective rib 95 may protrude in the forward direction of the bottom chassis 20.

A projection 97 having an embossed shape may be provided at one side of the combination part 96. When the reflective unit 90 is mounted on the bottom chassis 20, the projection 97 pressurizes the rear surface of the bottom chassis 20 to fix the reflective unit 90 to the bottom chassis 20.

Holes 43 corresponding to the holes 23 of the bottom chassis 20 may be formed on the reflective sheet 40. The holes 43 formed on the reflective sheet 40 and the holes 23 formed on the bottom chassis 20 may overlap with each other. The combination part 96 of the reflective unit 90 passes through the holes 23 and 43 formed on the bottom chassis 20 and the reflective sheet 40. After the combination part 96 has passed through the holes 23 and 43, the reflective unit 90 may slide. The projection 97 formed on the combination part 96 may pressurize the rear surface of the bottom chassis 20. Thereby, the reflective unit 90 may be mounted on the bottom chassis 20 to be fixed to the bottom chassis 20. The reflective sheet 40 may be fixed to the bottom chassis 20 by the reflective units 90. The reflective ribs 94 and 95 of the reflective units 90 may face the light sources 31 located at the corners of the bottom chassis 20.

When the reflective ribs 94 and 95 of the reflective units 90 face the light sources 31 located at the corners of the bottom chassis 20, the light emitted from the light sources 31 located at the corners of the bottom chassis 20 may be reflected by the reflective parts 94' and 95' provided on the reflective ribs 94 and 95. Thus, the reflective light may be incident upon the corners of the bottom chassis 20. Light incident upon the corners of the bottom chassis 20 may be reflected by the reflective sheet 40 provided on the lower surface part 21 or the side surface part 22 of the bottom chassis 20. Thus, the light may be incident upon the liquid crystal panel 60. Therefore, a sufficient amount of light is transmitted to the corners of the liquid crystal panel 60 for preventing generation of dark regions at the corners of the display device 1. Thus, luminance of the display device 1 may be improved and overall picture quality may be enhanced.

The reflective units 90 may be provided at all corners of the display device 1. If the display device 1 has a rectangular shape, the reflective units 90 may be provided at all four corners of the display device 1.

In order to allow the display device 1 to achieve the highest picture quality, a distance between the light source 31 and the reflective unit 90, an angle or a length of the reflective ribs 92 and 93, and an angle between the side surface part 22 of the bottom chassis 20 and the reflective ribs 92 and 93, may be adjusted according to the model of the display device 1.

In accordance with the above embodiment, generation of dark regions at the corners of the display device 1 may be prevented so that the display device 1 has uniform luminance. Thus, the display device 1 may have the highest picture quality.

As is apparent from the above description, a display device in accordance with one embodiment secures a sufficient amount of light at the corners thereof by reflecting light emitted from light sources located at the corners of the display device by reflective units. Thus, since generation of dark regions is prevented the display device in the embodiment has improved luminance and high picture quality.

Although a few embodiments have been shown and described, it would be appreciated by those skilled in the art that changes may be made in these embodiments without departing from the principles and spirit, the scope of which is defined in the claims and their equivalents.

What is claimed is:

1. A display device comprising:
   a liquid crystal display configured to display an image;
   a plurality of backlights which are disposed in a rear area of the liquid crystal display and comprise a plurality of point light sources;
   a bottom chassis on which the backlights are disposed; and
   a plurality of reflective devices which are mounted on the bottom chassis and reflect light, which is emitted from a plurality of light sources disposed at corners of the bottom chassis and diffused in a sideward direction, toward the corners of the bottom chassis so as to secure a sufficient amount of light at the corners of the bottom chassis.

2. The display device according to claim 1, wherein a reflective sheet is disposed on an inner surface of the bottom chassis.

3. The display device according to claim 2, wherein the bottom chassis includes a lower surface part and a side surface part, and the reflective sheet is disposed on the lower surface part and the side surface part.

4. The display device according to claim 2, wherein the reflective devices are disposed on the reflective sheet.

5. The display device according to claim 4, wherein the reflective devices are mounted on the bottom chassis via the reflective sheet to fix the reflective sheet to the bottom chassis.

6. The display device according to claim 1, wherein each of the reflective devices includes:
   a body;
   a plurality of arms which extend from one end of the body; and
   a plurality of reflective ribs which protrude from the arms in a forward direction in which the liquid crystal display is located.

7. The display device according to claim 6, wherein the arms include a first arm which is extended from the one end of the body in a leftward direction and a second arm which is extended from the one end of the body in a rightward direction.

8. The display device according to claim 6, wherein a plurality of reflective parts which are formed of metal having high reflectance are disposed on the reflective ribs.

9. The display device according to claim 8, wherein the reflective parts comprise tapes which are formed of silver or panels which are formed of silver.

10. The display device according to claim 8, wherein the reflective parts are formed of a same material as the reflective sheet.

11. The display device according to claim 8, wherein the reflective parts are formed of a material having a similar reflectance as the reflective sheet.

12. The display device according to claim 6, wherein a combination part which protrudes in a direction opposite the reflective ribs is disposed on the body.

13. The display device according to claim 12, wherein holes are provided on the bottom chassis, and each of the reflective devices is mounted on the bottom chassis by inserting the combination part into each of the holes, and then sliding each of the reflective devices.

14. The display device according to claim 13, wherein a projection is provided on the combination part and pressurizes a rear surface of the bottom chassis to fix each of the reflective devices to the bottom chassis in response to each of the reflective devices being mounted on the bottom chassis.

15. The display device according to claim 13, wherein a reflective sheet is disposed on the bottom chassis to be fixed to the bottom chassis by causing the combination part to pass through the reflective sheet and the bottom chassis, and then sliding each of the reflective devices.

16. A display device comprising:
   a body;
   a plurality of arms which extend away from one side of the body in a diagonal direction; and
   a plurality of reflective ribs which extend away from the arms in a first perpendicular direction from a surface of the arms and are configured to reflect light towards a corner of a chassis from a light source disposed near said corner of the chassis.

17. The display device of claim 16, wherein the plurality of arms comprises:
   a first arm which extends away from the one end of the body in a leftward diagonal direction; and
   a second arm which extends away from the one end of the body in a rightward diagonal direction.

18. The display device of claim 16, further comprising:
   a plurality of reflective parts which are disposed on the reflective ribs,
   wherein the reflective parts are formed of a metal having high reflectance.

19. The display device of claim 16, further comprising:
   a combination part which protrudes in a second perpendicular direction opposite the first perpendicular direction of the reflective ribs.

20. The display device of claim 16, wherein the display device is further configured to reflect light, which is emitted from a plurality of light sources and diffused in a sideward direction, so as to secure a sufficient amount of light for preventing dark regions.

* * * * *